July 18, 1933.  E. B. GILL  1,918,596
SWITCH VALVE
Filed Nov. 11, 1929  2 Sheets-Sheet 1

INVENTOR
Eldridge B. Gill
BY
ATTORNEY

July 18, 1933.  E. B. GILL  1,918,596

SWITCH VALVE

Filed Nov. 11, 1929  2 Sheets-Sheet 2

INVENTOR
Eldridge B. Gill
BY
ATTORNEY

Patented July 18, 1933

1,918,596

UNITED STATES PATENT OFFICE

ELDRIDGE B. GILL, OF OKLAHOMA CITY, OKLAHOMA

SWITCH VALVE

Application filed November 11, 1929. Serial No. 406,301.

My invention relates to distributor valves, and more particularly to a device of that character for use in selectively controlling supply of mud-laden fluid, or slush, to a rotary well drill.

In drilling wells with rotary tools a mud-laden fluid, commonly known as mud or slush, is delivered under pressure to the drill bit for cleaning the bit, removing the cuttings and plastering the wall of the well hole, the mud or slush being supplied to the drill stem from a compressor or mud pump through flexible hose. With such equipment, it is not unusual for the hose to become disconnected from the drill stem or broken because of the high pressure in the line, or by other accident, thereby interrupting the drilling operation until the hose can be replaced or repaired.

It is the object of my invention to obviate such interruption of the drilling operation by duplication of the hose line and selective distribution of the mud or slush through such lines so that a broken or disconnected hose may be replaced without substantial loss of time, and flow from the compressor selectively controlled to cut off the flow from the broken line and direct it through the one freshly applied to the drilling tools.

In accomplishing this object, I have provided an improved valve structure, the preferred form of which is illustrated in the accompanying drawings, wherein.

Figure 1:
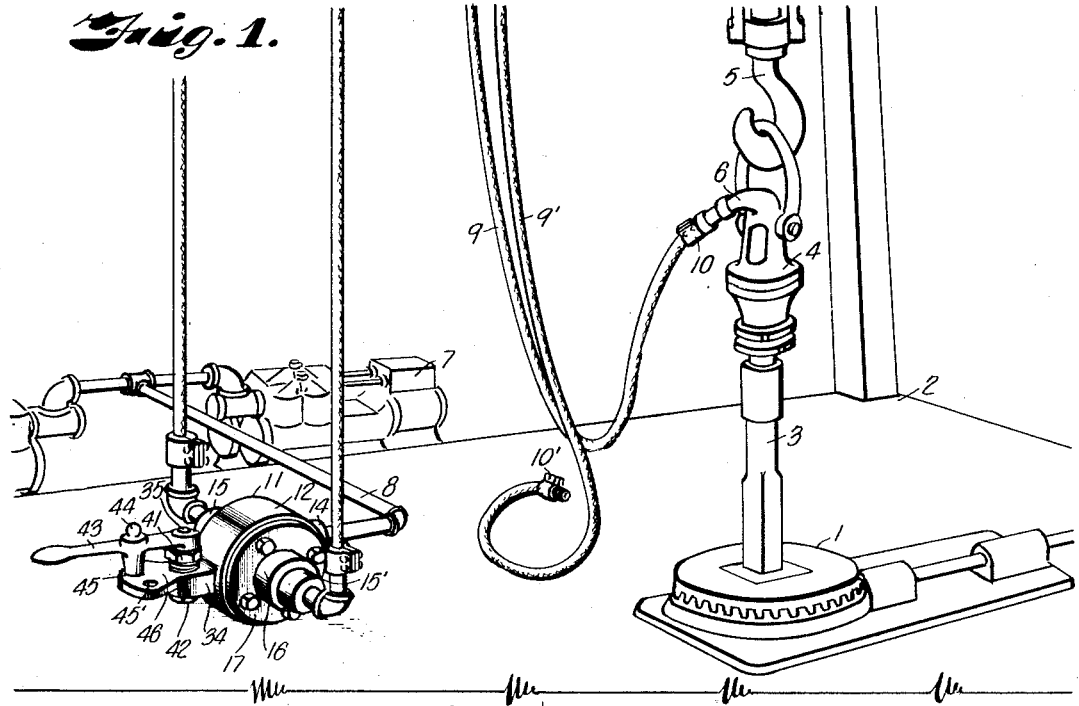
Fig. 1 is a perspective view of parts of a rotary well drilling outfit, including a valve of my improved construction.

Referring in detail to the drawings:

1 designates a rotary drill table set on a derrick floor 2, and 3 a drill stem extended through the table and provided with a swivel coupling 4 adapted for suspension from a hook 5, and provided with a mud nipple 6 in accordance with common practice.

7 designates a mud pump having a line 8 for supplying mud to the drill stem, and 9—9' flexible hose members adapted for selective connection with the nipple 6 through couplings 10—10'.

11 designates the housing of my improved valve, including a central body portion 12 inclosing a central chamber 13, having a single peripheral nipple 14 connected with the supply line 8 leading from the compressor, and outlet nipples 15—15' at opposite ends of the valve housing connected respectively with the duplicate hose lines 9—9'.

The nipples 15—15' are formed on the ends of cap members 16 having flanges 17 bolted to the ends of the central body portion 12 of the housing, and having tapered walls 18 providing a substantial stream line with the tapered walls 19 of the central body portion to direct flow from the inlet nipple 14 to the outlet nipples 15—15'; the intermediate portions 20 of the nipple members having channels 21 providing communication between the housing chamber 13 and the nipple channels 22. The inner walls of the cap members 16 are extended into the channels 21 to form diaphragms 23 having flow ports 24 providing communication between the housing chamber 13 and the cap channels 21, and having central openings 25 for guiding the stems of a valve member presently described.

26 designates the valve member having tapered heads 27 on its opposite ends co-operative with the tapered walls 18 of the cap members to seal off the flow ports 24 of the respective diaphragms 23, the tapered walls 18 thus forming seats for the valve heads 27. The valve member 26 is of such dimensions that it may have shifting movement within the chamber 13 and is carried by stems 28 fixed to the apices of the heads 27 and slidable in the openings 25 of the diaphragm 23; the depth of the chamber 13 and of the valve member being such that when the valve member is seated at one end of the chamber to close the corresponding nipple 15 or 15', the tapered surface of the open valve head will be in alignment with the inlet nipple 14 to divert flow of fluid toward the open ports 24.

The valve member 26 has a circumferential groove 29 therein, into which are projected the studs 30 of a yoke 31, having a shank 32 movable in an inclosed recess 33 in an extension 34 on the housing member, and extending transversely through the recess is a shaft 35 having a squared portion 36 seated in a squared socket 37 in the yoke shank so that when the shaft is reciprocated, the valve member is moved from one valve seat to the other to respectively open and close the nipples 15—15′.

The openings 38 in the extension of the valve housing are enlarged, as at 39, to receive packing 40 and gland members 41 for maintaining a sealing joint around the shaft 35. The shaft is anchored to the housing extension by a nut 42 on its lower end, and fixed to the outer end of the shaft is a handle 43 having a gravity pin 44 adapted to seat in either of the two sockets 45—45′ in a wing 46 projecting from the housing extension 33, so that when the valve is moved to either extremity of its movement it may be locked in position by the pin 44.

Figure 4:
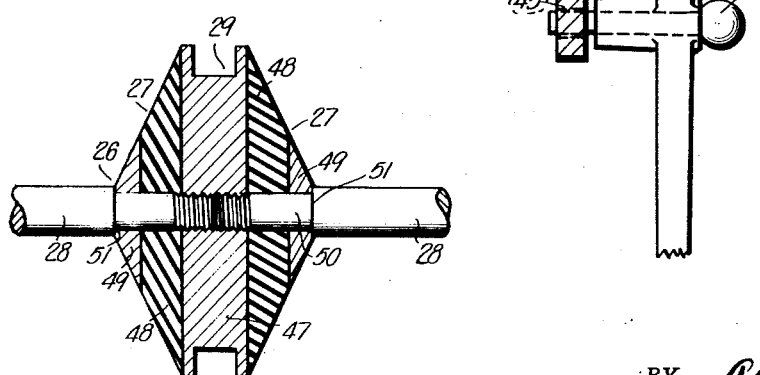
Fig. 4 is a central cross section of a preferred form of the double valve head, showing parts of the guide stems.

While the valve member may be of any suitable construction, I prefer that illustrated in Fig. 4, including a central metallic disk 47 containing the peripheral groove 29, with disks 48 of composition material on the opposite faces of the metallic disk to form a sealing connection with the seats 18, and washers 49 for retaining the disks 48 in place, the composite structure being held together by the guide stems 28, having shanks 50 threaded into the metallic disk 47 and shoulders 51 bearing against the washers, as illustrated.

Figure 2:
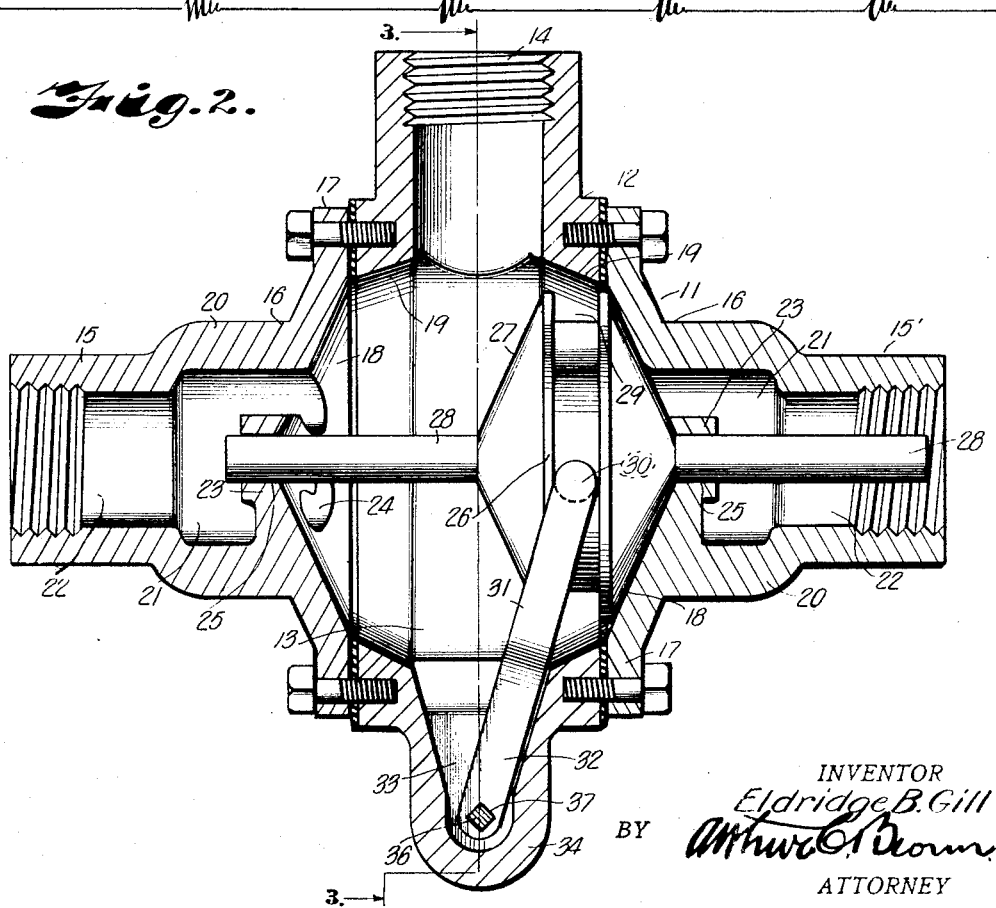
Fig. 2 is a horizontal section of the valve on the line 2—2, Fig. 3.
Figure 3:
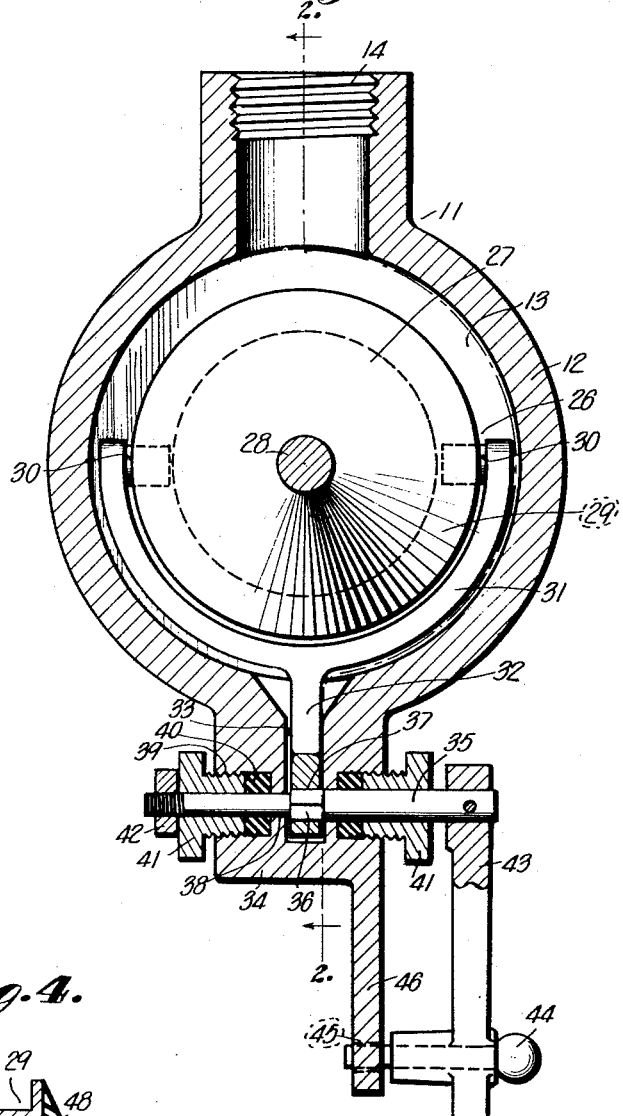
Fig. 3 is a vertical section on the line 3—3, Fig. 2.

Assuming the drilling equipment, including my improved valve, to be assembled and constructed as illustrated with the hose 9 connected with the drill stem and with the valve nipple 15, then the valve member is set as illustrated in Fig. 2 so that it diverts incoming mud or slush from the compressor through the nipple 15 and hose 9 to the drill stem 3 for delivery through the drill tube and bit (not shown) for the usual purposes.

Should the hose 9 become broken or disconnected from the drill stem, the compressor may be stopped for a long enough period for the hose 9 to be replaced by the hose 9′. As soon as the hose 9′ is connected with the stem, the valve 26 is shifted to change the line of flow from the nipple 15 to the nipple 15′ so that the fluid is directed to the drill stem through the hose 9′.

It is apparent from the foregoing description that the drilling operation need be interrupted for only a sufficient period for the change of hose to be effected, thereby avoiding loss of time and production which ordinarily result from shut down while a broken or disconnected hose is being repaired or replaced.

What I claim and desire to secure by Letters Patent is:

1. A valve of the character described, including a housing having an interior chamber, an inlet to the chamber and opposed outlets leading from the chamber, diaphragms at the ends of the chamber including valve seats and having flow ports and guide openings, a valve in said chamber having heads on its opposite sides co-operative with said seats, pins on said heads slidable in said guide openings, and means for shifting the valve to selectively open and close the outlets.

2. A valve of the character described, including a housing having an interior chamber, an inlet to the chamber and opposed outlets leading from the chamber, diaphragms at the ends of the chamber including valve seats and having flow ports and guide openings, a valve in said chamber having heads on its opposite sides co-operative with said seats, and an intermediate circumferential guide, pins on said heads slidable in the guide openings, a yoke co-operative with said circumferential guide, and means for actuating the yoke from the exterior of the guide to shift the valve.

3. A valve of the character described, including a housing having an interior chamber, an inlet to the chamber and opposed outlets leading from the chamber, diaphragms at the ends of the chamber including valve seats and having flow ports and guide openings, a valve in said chamber having heads on its opposite sides co-operative with said seats, and an intermediate circumferential guide, pins on said heads slidable in the guide openings, a yoke co-operative with said circumferential guide, a shaft journalled in the housing and fixed to the yoke, and a handle on said shaft for actuating the yoke to shift the valve.

4. A valve of the character described, including a housing having an interior chamber, an inlet to the chamber and opposed outlets leading from the chamber, diaphragms at the ends of the chamber including valve seats and having flow ports and guide openings, a valve in said chamber having heads on its opposite sides co-operative with said seats, and an intermediate circumferential guide, pins on said heads slidable in the guide openings, a yoke co-operative with said circumferential guide, a shaft journalled in the housing and fixed to the yoke, a handle on said shaft for actuating the yoke to shift the valve, and means for retaining the handle in selected position.

5. A valve of the character described comprising a housing including a substantially ring-like body having a transverse inlet, cap members attached to the ends of the body having tapered inner faces forming valve seats and having outlet nipples opening through said valve seats, a valve in said housing having tapered heads on its opposite ends co-operative with respective valve seats, and means for shifting the valve to selectively open one and close the other of said outlet nipples, one of said tapered valve heads being in the line of flow from the inlet when the other head is on its seat to divert flow to the open nipple.

ELDRIDGE B. GILL.